US008793335B2

(12) United States Patent
Kim

(10) Patent No.: US 8,793,335 B2
(45) Date of Patent: Jul. 29, 2014

(54) SYSTEM AND METHOD FOR PROVIDING MUSIC DATA

(75) Inventor: Moo Hyun Kim, Seoul (KR)

(73) Assignees: Moo Hyun Kim, Seoul (KR); Jae Kwang Kim, Seoul (KR)

( * ) Notice: Subject to any disclaimer, the term of this patent is extended or adjusted under 35 U.S.C. 154(b) by 109 days.

(21) Appl. No.: 13/250,056

(22) Filed: Sep. 30, 2011

(65) Prior Publication Data

US 2013/0086173 A1 Apr. 4, 2013

(51) Int. Cl.
*G06F 15/16* (2006.01)
*G06Q 30/00* (2012.01)

(52) U.S. Cl.
CPC .................................... *G06Q 30/00* (2013.01)
USPC ........................................................ 709/217

(58) Field of Classification Search
CPC ...................................................... G06Q 30/00
USPC ................................................. 709/205, 217
See application file for complete search history.

(56) References Cited

U.S. PATENT DOCUMENTS

| | | | | |
|---|---|---|---|---|
| 7,157,638 | B1 * | 1/2007 | Sitrick | 84/477 R |
| 7,297,856 | B2 * | 11/2007 | Sitrick | 84/477 R |
| 2002/0007719 | A1 * | 1/2002 | Hasegawa | 84/609 |
| 2003/0076963 | A1 * | 4/2003 | Wells | 381/1 |
| 2011/0307549 | A1 * | 12/2011 | Motsinger | 709/203 |

* cited by examiner

*Primary Examiner* — Kristie Shingles

(74) *Attorney, Agent, or Firm* — Lowe Hauptman & Ham, LLP

(57) ABSTRACT

The present application relates to a system and method for allowing musicians including composer, arranger, instrumental player and singer to provide music data by stages to complete a popular song or instrumental music. A system for providing music data according to the present invention includes a music data server for transmitting and receiving music data to and from at least four types of musician terminals including a first musician terminal or a composer terminal, a second musician terminal or an arranger terminal, a third musician terminal or an instrumental player terminal and a fourth musician terminal or a singer terminal; and a settlement server for performing settlement transactions related to the music data transmissions between the music data server and the musician terminals.

18 Claims, 6 Drawing Sheets

SYSTEM AND METHOD FOR PROVIDING MUSIC DATA

BACKGROUND OF THE INVENTION

The present invention relates to a system and method for allowing musicians including composer, arranger, instrumental player and singer to provide music data by stages to complete a popular song or instrumental music. The present invention also relates to a system and method for commercializing a completed popular song or instrumental music within the same system.

Recently a number of songs and music videos are uploaded to video-on-demand (VOD) servers such as YOUTUBE™ and amateur musicians are eager to upload their files to distribute their song, music, dance and other performances to the globe. However, the conventional VOD servers do not provide an opportunity for musicians to cooperate or co-work with each other. Nor the conventional VOD server provides an opportunity for musicians to get benefits by selling or promoting their own songs or instrumental music.

BRIEF SUMMARY OF THE INVENTION

The main purpose of the present invention is to provide musicians with a music data providing system which allows them to co-work each other to get a completed popular or instrumental music by allowing them to provide their own music data by stages.

A further purpose of the present invention is to provide a system and method for allowing musicians from all around the world to co-work each other by providing their own music data by stages, wherein a number of arrangements are made upon a piece of composition, a number of instrumental plays are made upon each of the arrangements, and a number of songs are made upon each of the instrumental plays by different person in each stage and, as a result, various versions of popular song and instrumental music could be made based upon only a piece of composition.

A further purpose of the present invention is to provide a system and method for maximizing the copyright income by generating a number of arrangements, instrumental music and popular songs based on a given composition.

A further purpose of the present invention is to provide a system and method for giving benefits to both musicians and their fans by distributing download fees earned from each downloading activity of fans for downloading the composition, arrangement, instrumental and popular song.

A further purpose of the present invention is to provide a system and method for giving benefits to both musicians and system operator of music data server, wherein each musician pays to the operator upload fees when he/she upload his/her own music data to the music data server and the system operator distributes the download fees earned from each downloading activity of fans or listeners for downloading the composition, arrangement, instrumental and popular song.

A further purpose of the present invention is to provide a system and method for completing, promoting and commercializing music in a short period of time by interlinking the musician themselves and with their fans.

A further purpose of the present invention is to provide a system and method which is easily connected to a further commercialization process such as music album design, music broadcasting, online/offline music performance, social funding for musicians and music promotion, and to a recent communication platforms such as social network services and relevant smart phone applications.

The aforementioned purpose of the present invention can be accomplished by a system for providing music data comprising a music data server for transmitting and receiving music data to and from at least two musician terminals including a former stage musician terminal and an latter stage musician terminal; and a settlement server for performing settlement transactions related to the music data transmissions between the music data server and the musician terminals, wherein the music data server processes the music data by stages by receiving a former stage music data from the former stage musician terminal, storing the received former stage music data, transmitting the stored former stage music data to the latter stage musician terminal upon request from the latter stage musician terminal, receiving the latter stage music data from the latter stage musician terminal and storing the received latter stage music data.

In the above system, the former and latter stage terminals are selected from a group of musician terminals consisting of composer terminal, arranger terminal, instrumental player terminal and singer terminal.

In the above system, upon request from the former musician terminal designating at least one latter musician terminal, the music data server transmits to the designated latter musician terminals the music data upload status and request for latter musical work.

In the above system, as a result of request from the former musician terminal designating at least one latter musician terminal, the music data server performs permission, rejection or deletion regarding the music data uploaded by the latter musician terminal.

In the above system, the settlement server refunds the upload fee charged from the latter musician when the music data uploaded by the latter musician terminal is rejected or deleted by the music data server as a result of request from the former musician terminal.

According to another aspect of the present invention, there is provided a system for providing music data comprising a music data server for transmitting and receiving music data to and from at least four types of musician terminals including a first musician terminal or a composer terminal, a second musician terminal or an arranger terminal, a third musician terminal or an instrumental player terminal and a fourth musician terminal or a singer terminal; and a settlement server for performing settlement transactions related to the music data transmissions between the music data server and the musician terminals, wherein the music data server processes the music data by stages by receiving a former stage music data from a former stage musician terminal, storing the received former stage music data, transmitting the stored former stage music data to a latter stage musician terminal upon request from the latter stage musician terminal, receiving the latter stage music data from the latter stage musician terminal and storing the received latter stage music data.

In the above system, the settlement server charges music data upload and download fees and distributes the fees to the musicians.

In the above system, the system for providing music data further comprises a number of customer terminals, wherein the music data server allows the customer terminal to download the stored music data and the settlement server charges music data download fee and distributes the fee to the musicians.

In the above system, the music data server defines the customer who downloaded the music data as a fan to the piece of music or the musicians who have been involved in the completion of the music, and thereafter transmits to the fan's customer terminal uploaded or updated information regarding the music data or the each of the musician.

In the above system, the music data server transmits a request for sponsorship to the customer terminal for sponsoring a musician or a piece of music data and receives a sponsorship deal from the customer terminal designating a musician or a piece of music data, and the settlement server receives the sponsorship contribution and distributes the sponsorship contribution to the designated musician or music data.

According to another aspect of the present invention, there is provided a system for providing music data comprising a music data server for transmitting and receiving music data to and from a number of musician terminals including at least one composer terminal, at least one arranger terminal, at least one instrumental player terminal and at least one singer terminal; and a settlement server for performing settlement transactions related to the music data transmissions between the music data server and the musician terminals, wherein the music data server comprises: a composed music processing means for generating composed music data from composed music file and its related information received from the composer terminal, and storing the composed music data to a composed music database; an arranged music processing means for transmitting the composed music data stored in the composed music database to the arranger terminal, generating arranged music data from arranged music file and its related information received from the arranger terminal, and storing the arranged music data to an arranged music database; an instrumental music processing means for transmitting the arranged music data stored in the arranged music database to the instrumental player terminal, generating instrumental music data from instrumental music file and its related information received from the instrumental player terminal, and storing the instrumental music data to an instrumental music database; and a popular music processing means for transmitting the instrumental music data stored in the instrumental music database to the singer terminal, generating popular music data from popular music file and its related information received from the singer terminal, and storing the popular music data to a popular music database.

In the above system, the related information comprises information of musician and at least one other information regarding generation date of copyright, explanation of music, a request for latter musical works, and musician's comment.

In the above system, the arrangement-related information comprises a request for a set of instrumental players, the instrumental music processing means transmits the arranged music data to a set of instrumental player terminals corresponding to the request, receives a set of instrumental music files distinguishable by musical instrument type from the set of instrumental player terminals, generates a whole piece of instrumental music data by mixing the multiple of instrumental music files, and storing the instrumental music data to the instrumental music database.

In the above system, the arrangement-related information comprises a request for the arranger review of the instrumental music data, the instrumental music processing means transmits at least one partial instrumental music files or the whole piece of instrumental music file to the arranger terminal and performs permission, rejection or deletion of at least one partial instrumental music file or the whole piece of instrumental music file upon a relevant request from the arranger terminal.

In the above system, the popular music processing means transmits the instrumental music data stored in the instrumental music database to the singer terminal, receives a vocal file and its related information from the singer terminal, generates the popular music data by mixing the instrumental music file from the instrumental music database and the vocal file received from the singer terminal, and stores the popular music data to the popular music database, wherein the popular music data comprise a popular music file and its related information including the information of each musician who has been involved in the process of completing the popular music data.

In the above system, music data server and the settlement server are connected to a number of customer terminals, and the music data server further comprises a download processing part and download information database, wherein the download processing part counts the number of times of download with regard to the music data, the musician and the customer and store count data to the download information database.

In the above system, the download processing part makes popularity data for each piece of music and each musician based on the count data and stores the popularity data to the download information database.

In the above system, the music data server further comprises a fan management part that generates and manages fan relationship data between each musician and customer based on download information retrieved from the download information database, and a fan database that stores the fan relationship data, wherein the fan management part sends to customer terminal recommendations regarding other music data uploaded or updated by any musician whom the customer has fan relationship with.

In the above system, the music data server further comprises a sponsor management part that generates and manages sponsor relationship data between sponsoring customer and musician to be sponsored based on fan relationship data retrieved from the fan database, and a sponsor database that stores the sponsorship data for each musician and customer.

In the above system, the fan management part defines a customer who downloaded any music data in which a particular musician has been involved to be a fan of the particular musician.

The aforementioned purpose of the present invention can be accomplished by a method for providing music data comprising the steps performed by the components of the above system for providing music data.

The word 'popular music' has been and will be used in the present invention as normal music having both instrumental and vocal parts mixed with each other, whereas the world 'instrumental music' has been and will be used as instrumental music without vocal parts. The instrumental music could be a completed form of commercially available music and it also could be used as an intermediary member of a completed form of popular music of the present invention.

According to the present invention, there is provided a system and method for providing music data having a number of technical or commercial effects that are closely related to the purpose of the present invention.

According to the present invention, there is provided a system and method for providing music data for allowing musicians to co-work each other to get a completed popular or instrumental music by allowing them to provide their own music data by stages.

According to the present invention, there is provided a system and method for providing music data for allowing musicians from all around the world to co-work each other by providing their own music data by stages, wherein a number of arrangements are made upon a piece of composition, a number of instrumental plays are made upon each of the arrangements, and a number of songs are made upon each of the instrumental plays by different person in each stage and, as a result, various versions of popular songs and instrumental music could be made based upon only a piece of composition.

According to the present invention, there is provided a system and method for providing music data for maximizing the copyright income by generating a number of arrangements, instrumental music and popular songs based on a given composition.

According to the present invention, there is provided a system and method for providing music data for giving benefits to both musicians and their fans by distributing download fees earned from each downloading activity of fans for downloading the composition, arrangement, instrumental music and popular music.

According to the present invention, there is provided a system and method for providing music data for giving benefits to both musicians and system operator of music data server, wherein each musician pays to the operator upload fees when he/she upload his/her own music data to the music data server and the system operator distributes the download fees earned from each downloading activity of fans or listeners for downloading the composition, arrangement, instrumental music and popular music.

According to the present invention, there is provided a system and method for providing music data for completing, promoting and commercializing music in a short period of time by interlinking the musician themselves and with their fans.

According to the present invention, there is provided a system and method for providing music data which could be easily connected to a further commercialization process such as music album design, music broadcasting, online/offline music performance, social funding for musicians and music promotion and to a recent communication platforms such as social network services and relevant smart phone applications.

DETAILED DESCRIPTION OF THE INVENTION

Hereinafter the aforementioned and further aspects of the present invention will be explained by preferred embodiments so that any person of ordinary skill in the pertinent art could make and use the present invention without extensive experimentation.

Figure 1:
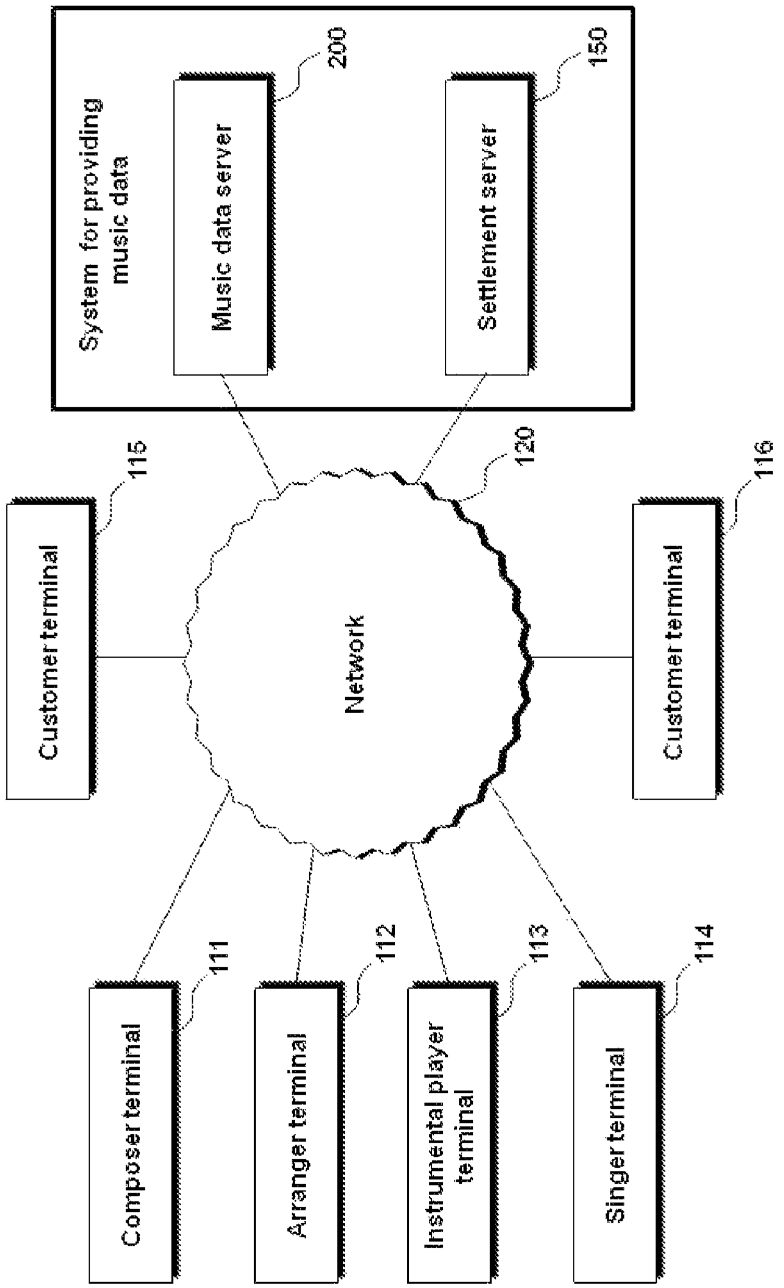
FIG. 1 shows a system for providing music data according to an embodiment of the present invention.

FIG. 1 shows a system for providing music data according to an embodiment of the present invention. In FIG. 1, the system for providing music data according to a preferred embodiment of the present invention comprises a music data server 200 and a settlement server 150 connected through network to a number of musician terminals and customer terminals. The musician terminals include at least one composer terminal 111, at least one arranger terminal 112, at least one instrumental player terminal 113 and at least one singer terminal 114. The customer terminals include at least one customer terminal 115, 116 used by customers of music produced by the system of the present invention.

The both the musician terminals 111, 112, 113, 114 and the customer terminals 115, 116 may be any kind of communication terminal capable of global networking such as mobile internet terminals, smart terminals such as smart phone and smart pad, PCs and notebooks. That is, the musician terminals 111, 112, 113, 114 and the customer terminals 115, 116 are not divided by their hardware configuration but by their own roles or functions used in the present invention. For example, wherein a man work on both composition and arrangement of music the composer terminal 111 and the arranger terminal 112 could be the same communication terminal, and wherein the arranger of music buys a completed version of popular music his/her arranger terminal 112 could be the customer terminal 115, 116 at the moment. The network of FIG. 1 comprises any kind of communication network including, among others, fixed/mobile internet, 2G/3G/4G communication networks, VoIP network, wired/wireless LANs and other types of future network to come.

The settlement server 150 performs monetary settlement transactions related to the music data transmissions between the music data server 200 and the user terminals 111-116. The monetary transactions include, but not limited to, cash transaction, cyber money transaction, credit/debit/cash card point transactions, and mobile transaction using smart applications for settlement purposes.

A person who composed a piece of music may use his/her communication terminal i.e., the composer terminal 111 to transmit his/her music file together with composition-related information to the music data server 200 to store them in a music database (not shown) as composed music data. The music database may store various kinds and pieces of music composed by a number of different composers. In the FIG. 1, the music database is assumed to be contained in the music data server 200 however it may be configured to be an independent database server in other embodiment.

Then, a person who desires to arrange the composed music stored in the music database may use his/her arranger terminal 112 to search the music database and fetch his/her desired music composition from the music database. The arranger may make an arrangement onto the composition and transmit an arranged music file and arrangement-related information to the music data server 200 to store them in the music database as arranged music data.

Then, a person who desires to play the arranged music stored in the music database may use his/her instrumental player terminal 113 to search the music database and fetch his/her desired music arrangement from the music database. The instrumental player may make a team comprising various kinds of instrumental players to play the arranged music, produce a multiple of instrumental music files played by each musical instrument and generate a whole piece of instrumental music file by mixing the multiple of instrumental music files. The instrumental player may use the instrumental player terminal 113 to transmit the whole piece of instrumental music file together with instrumental-related information to the music data server 200 to store them in the music database as instrumental music data.

According to an another aspect of the present invention, the arranger may notify his/her favorite instrumental players via the arranged music file-related information containing a request for his/her favorite instrumental players that he/she desires them to join a team for producing an instrumental music. Then each player who plays different musical instrument may search and fetch the same arranged music data of the arranger and play only his/own part of the instrumental music to produce and transmit a multiple of partial instrumental music files together with each related information using his/her instrumental player terminal 113. In this case, the music data server 200 generates a whole piece of instrumental music file and a whole piece of instrumental-related information by mixing the multiple of partial instrumental music files and combining the multiple pieces of partial instrumental-related information, respectively. The music data server 200 stores the resultant whole piece of instrumental music file together with instrumental-related information in the music database as instrumental music data.

Then, a person who desires to sing the instrumental music stored in the music database may use his/her singer terminal 114 to search the music database and fetch his/her desired instrumental music from the music database. The singer may mix his/her song with the instrumental music file and transmit a resultant popular music file and song-related information to the music data server 200 to store them in the music database as popular music data.

Then, a person who desires to listen to the popular or instrumental music stored in the music database may use his/her customer terminal 115, 116 to search the music database and fetch his/her desired popular or instrumental music from the music database. The customer shall pay a download fee at the time of downloading the music data. This payment process shall apply when downloading other types of music data such as composed music data and arranged music data in a similar way.

In the aforementioned way, the music data server 200 processes the music data by stages by receiving a former stage music data from the former stage musician terminal, storing the received former stage music data, transmitting the stored former stage music data to the latter stage musician terminal upon request from the latter stage musician terminal, receiving the latter stage music data from the latter stage musician terminal, storing the received latter stage music data, and then repeating the same steps for further stages.

In the above system, as a result of a request from the former musician terminal designating at least one latter musician terminal, the music data server may perform permission, rejection or deletion regarding the music data received from the latter musician terminal. For example, when the arranger organized an instrumental player team for playing his/her arranged music he/she may edit the whole piece of instrumental music file by permitting, rejecting or deleting each partial instrumental music file provided or uploaded by each instrumental player. In this regard, the settlement server 150 may refund the upload fee charged from a drummer, for example, when the drummer's partial instrumental file is rejected by the music data server 200 upon a rejection request from the arranger terminal 112.

In the above system, the settlement server 150 may charge music data upload and download fees and distributes the fees to the musicians. For example, each of the composer, arranger and instrumental player shall pay music data upload fee when he/she transmit or upload his/her music file and its related information to the music data server 200, and this music data upload fee could be used for the operation of the system by a system operator.

The concept of upload fee may make the business model of the present invention commercially profitable to the system operator who has to spend money to expand the storage capacity in the initial business stage to accommodate increasing numbers of music data while not so many customers use and pay download fee for the completed instrumental or popular music data of this system.

As another example, each customer who desires to download the music data including the popular music data, all or part of the instrumental music data, the arranged music data and the composed music data shall pay music data download fee, which is to be charged by the settlement server 150 and then to be distributed among the system operator, the composer, the arranger, the instrumental players and the singers. In a preferred embodiment, the composer, the arranger and the instrumental player shall pay the upload fee when they upload their own music data to the music data server 200, and then they shall be rewarded by distribution of download fee paid by a singer when the singer pays download fee for downloading the instrumental music data in which they have been involved. The singer may be rewarded by distribution of download fee paid by customers when the customer pays download fee for downloading the popular music data in which he/she has been involved.

Figure 2:
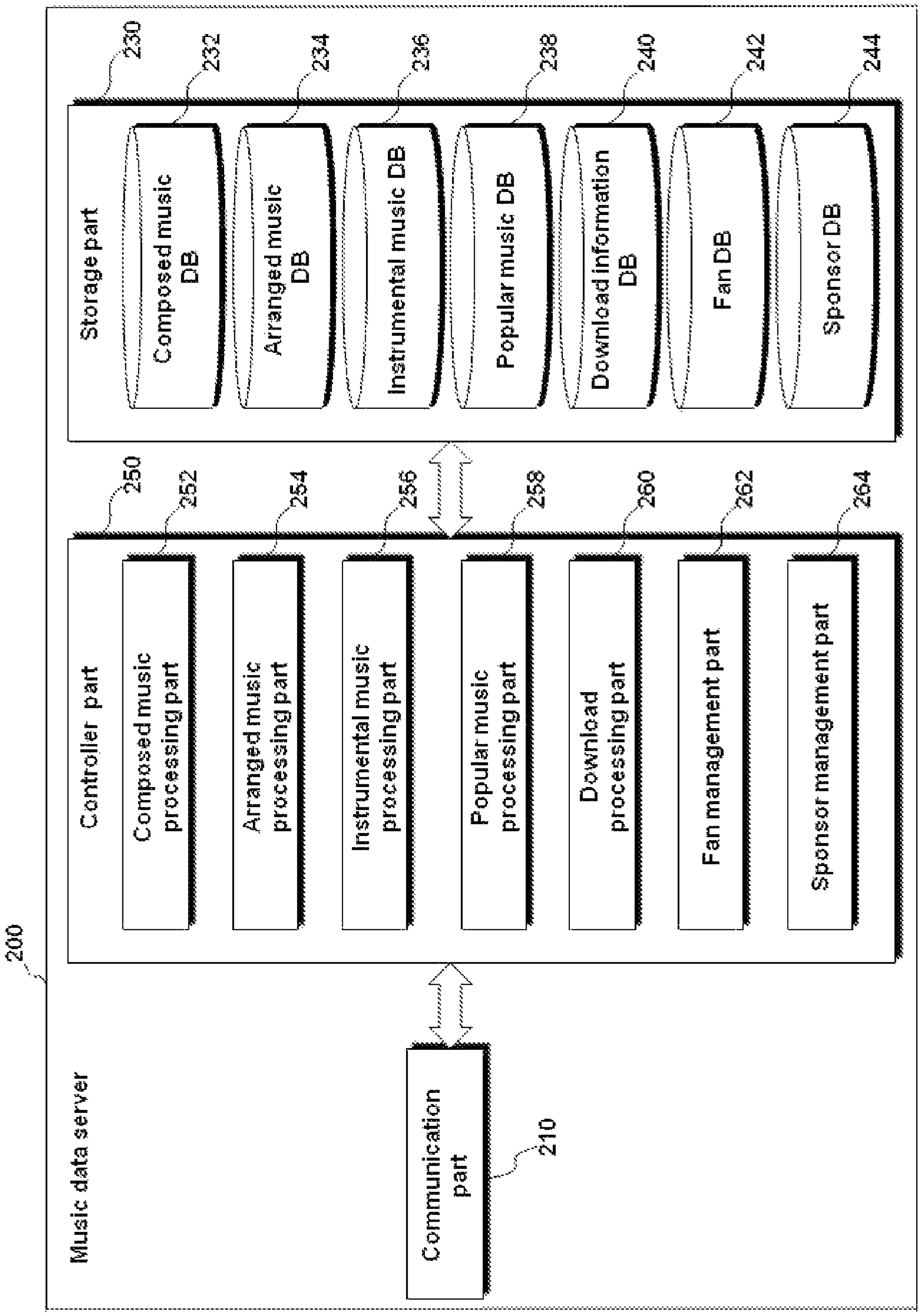
FIG. 2 is a block diagram of a music data server according to the system for providing music data of FIG. 1.

FIG. 2 is a block diagram of a music data server according to the system for providing music data of FIG. 1. The music data server 200 may comprise a communication part 210, a controller part 250 and a storage part 230.

The communication part 210 transmits music data to and from the composer terminal 111, arranger terminal 112, instrumental player terminal 113, singer terminal 114, customer terminals 115, 116 and the settlement server 150 in FIG. 1. The communication part 210 may comprise I/O interface for at least, among others, fixed/mobile internet, 2G/3G/4G communication networks, VoIP network and wired/wireless LANs.

The storage part 230 comprises program memories and data memories, wherein the program memories store computer programs for providing music data provision service and the data memories store data produced by the execution of the stored computer programs or inputted by external terminals 111-116 and settlement server 150. In an embodiment illustrated in FIG. 2, the storage part 230 comprises a number of databases including a composed music database 232, an arranged music database 234, an instrumental music database 236, a popular music database 238, a download information database 240, a fan database 242 and a sponsor database 244.

The controller part 250 controls the overall process of the music data server 200 by using the stored data in the storage part 230. In the embodiment illustrated in FIG. 2, the controller part comprises a number of processing parts including a composed music processing part 252, an arranged music processing part 254, an instrumental music processing part 256, a popular music processing part 258, a download processing part 260, a fan management part 262 and a sponsor management part 264.

In the operation, external user terminals 111-116 may have an access to the music data server 200 and the settlement server 150 through a user interface comprising, among others, an internet website, a mobile website, an interface given by a dedicated software application for smart terminals.

A composer may prepare a composed music file and its related information. The composed music file may be in a format of music sheet or computer-readable music file and the composition-related information may comprise the information of the composer, the generation date of copyright, explanation of music and a request to an arranger regarding musical arrangement of the composition. The information of the composer may include composer ID, nickname, field of activity, number of fans, etc.

The composer may transmit the composed music file and the related information using the composer terminal 111 to the composed music processing part 252 of the music data server 200. The composed music processing part 252 generates composed music data from the composed music file and its related information received from the composer terminal 111, and then stores the composed music data to a composed music database 232 of the music data server 200.

If the composer designates at least one preferred arranger for his/her composition in the request for an arranger section of the composition-related information then the composed music processing part 252 may transmit the upload status of the composed music data and a request for further arrangement work to the designated arranger terminal 112.

An arranger may access the music data server 200, search the composed music database 232, and request for downloading of a particular composed music data of his/her interest. Then the arranged music processing part 254 transmits the requested composed music data stored in the composed music database 232 to the arranger terminal 112.

The arranger may prepare an arranged music file and its related information. The arranged music file may comprise arrangements for musical notes, musical instruments and sound mixing information, etc. The format of the arrangement-related information shall be similar to that of the composition-related information.

The arranger may transmit the arranged music file and the arrangement-related information using the arranger terminal 112 to the arranged music processing part 254. The arranged music processing part 254 generates arranged music data from the received arranged music file and arrangement-related information, and then stores the arranged music data to an arranged music database 234.

If the arranger designated at least one preferred instrumental player for his/her arrangement in the request for an instrumental player section of the arrangement-related information then the arranged music processing part 254 may transmit the upload status of the arranged music data and a request for further instrumental work to the designated instrumental player terminals 112.

The arranged music processing part 254 may also transmit the upload status of the arranged music data and the request for further instrumental work to the composer terminal 111 of the composer who originally composed the arranged music so that the composer may perform permission, rejection or deletion regarding the arranged music data. When the arranged music processing part 254 or the instrumental music processing part 256 receives request for rejection or deletion of the arranged music data from the composer terminal 111, the arranged music processing part 254 may perform rejection or deletion of the arranged music data with/without consent from the arranger terminal 112. When the arranged music processing part 254 performs rejection or deletion of the arranged music data the settlement server 150 may refund the upload fee charged from the arranger.

An instrumental player may access the music data server 200, search the arranged music database 234, and request for downloading of a particular arranged music data of his/her interest. Then the instrumental music processing part 256 transmits the requested arranged music data stored in the arranged music database 234 to the instrumental player terminal 113.

If the instrumental player may wish to play the originally composed music then he/she may search the composed music database 232. In this case, depending upon the embodiment, the instrumental music processing part 256 or the arrangement music processing part 254 will fetch or transmit the requested composed music data from the composed music database 232 to the instrumental player terminal 113. Similar operations may be performed between other music database 234, 236, 238 and other music processing parts 258, 260.

It should be emphasized that each of the music processing parts 252-264 of the controller part 250 and each of the music database 232-244 of the storage part 230 are only conceptually distinguished from other music processing parts or music database, respectively, and therefore a particular function of part A of the music server 200 which is disclosed in this specification could be performed by part B of the music server 200 or other connected server in the network in other embodiment of the present invention, which would be clearly understood by an ordinary skilled person in the pertinent art.

The instrumental player may make a team comprising various kinds of instrumental players to play the arranged music, produce a multiple of partial instrumental music files played by each musical instrument and generate a whole piece of instrumental music file by mixing the multiple of partial instrumental music files. The instrumental player may use the instrumental player terminal 113 to mix the multiple of partial instrumental music files into the whole piece of instrumental music file. The instrumental player may use the instrumental player terminal 113 to transmit the whole piece of instrumental music file together with instrumental-related information to the instrumental music processing part 256. The instrumental music processing part 256 stores the received whole piece of instrumental music file and the instrumental-related information in the instrumental music database 236 as instrumental music data.

Otherwise, the arranger may notify his/her favorite instrumental players via the arrangement-related information containing a request for the above instrumental players that he/she desires them to join a team for producing a whole piece of instrumental music based on his/her arrangement. Then each instrumental player who plays different musical instrument may search the arranged music database 234 to fetch the same arranged music data of the arranger, and play only his/own part of the instrumental music to produce and transmit only his/her partial instrumental music file together with his/her partial instrumental related information using his/her instrumental player terminal 113. In this case, the instrumental music processing part 256 generates a whole piece of instrumental music file and a whole piece of instrumental-related information by mixing the multiple of partial instrumental music files and combining the multiple pieces of partial instrumental-related information received from the multiple of instrumental player terminals 113, respectively. The instrumental music processing part 256 stores the resultant whole piece of instrumental music file together with instrumental-related information in the instrumental music database 236 as instrumental music data.

A singer may access the music data server 200, search the instrumental music database 236, and request for downloading of a particular instrumental music data of his/her interest. Then the popular music processing part 258 transmits the requested instrumental music data stored in the instrumental music database 236 to the singer terminal 114.

If the singer wishes to play the originally composed music then he/she may search the composed music database 232. In this case, depending upon the embodiment, the popular music processing part 258 or the arrangement music processing part 254 will fetch or transmit the requested composed music data from the composed music database 232 to the singer terminal 114.

The singer may prepare a popular music file by mixing his/her song with the instrumental music file and prepare popular music-related or song-related information. The song-related information may comprise, among others, the information regarding the singer, the instrumental player, the arranger and the composer of the popular music. The singer may transmit the popular music file and the song-related information to the popular music processing part 258 using the singer terminal 114. The popular music processing part 256 stores the received popular music file and song-related information to a popular music database 238 as popular music data.

Otherwise, the singer may prepare only his/her vocal file and the song-related information and transmit the prepared vocal file and song-related information to the popular music processing part 258 using the singer terminal 114. In this case, the song-related information may contain information regarding the instrumental music data which the song shall be mixed with. The popular music processing part 258 shall fetch the instrumental music data from the instrumental music database 236 and produce a popular music file by mixing the received vocal file with the instrumental music file contained in the fetched instrumental music data. Then the popular music processing part 258 stores the produced popular music file and the received song-related information to the popular music database 238 as popular music data.

If the instrumental player designated at least one preferred singer for his/her instrumental music in the request for a singer section of the instrumental-related information then the instrumental music processing part 256 may transmit the upload status of the instrumental music data and a request for further singing work to the designated singer terminal 114.

The popular music processing part 258 may also transmit the upload status of the popular music data to the instrumental player terminal 113 of at least one of the instrumental players who made the instrumental music so that at least one of the instrumental players may perform permission, rejection or deletion regarding the popular music data. When the instrumental music processing part 256 or the popular music processing part 258 receives request for rejection or deletion of the popular music data from at least one of the instrumental player terminals 113, the popular music processing part 258 may perform rejection or deletion of the popular music data with/without consent from the singer terminal 114. When the popular music processing part 258 performs rejection or deletion of the popular music data the settlement server 150 may refund the upload fee charged from the singer.

A customer may access the music data server 200, search the instrumental music database 236 or the popular music database 238, and request for downloading of a particular instrumental or popular music data of his/her interest. Then a download processing part 260 may request the instrumental or popular music processing part 256, 258 to transmit the requested instrumental or popular music data stored in the instrumental or popular music database 236, 238, respectively, to the requesting customer terminal 114, 115

The download processing part 260 may count the number of times of download with regard to the music data, the musicians and the customers and store the count data to the download information database 240. The download processing part 260 may also make popularity data for each music data as well as each musician and store the popularity data to the download information database 240. While the settlement server 150 normally charges a music data download fee in advance to each download of the instrumental or popular music, it may charge the download fee in a weekly, monthly or on other periodical basis based on the count data for each customer stored in the download information database 240.

The fan management part 262 manages the relationship between musicians each other and between each musician and each customer. The fan management part 262 may configure fan relationship data according to the download information received from the download information database 240 and store the fan relationship data to a fan database 242. In an exemplary case, a customer or musician who downloaded any music data in which a particular musician has been involved could be a fan of the particular musician. In this case, if a piece of popular music data has been downloaded by a hundred people, each of the hundred people are recognized as fan of each musician who has been involved in the process of completing the popular music data. This fan relationship allows the musician to acquire as many fans as possible in a short period of time.

The fan management part 262 may send to customer terminals 115, 116 recommendations regarding other music data produced or uploaded by any musician that the customer has a fan relationship. The fan management part 262 may also send news messages to the fans of every musician who has been involved in the process of completing a new instrumental or popular music data. This recommendation process allows the musician to have an efficient promotion mechanism toward a number of customers who are likely to be interested in the recommended music data in a short period of time.

The system of the present invention may adopt the mechanism of social funding for musicians by further employing the sponsor management part 264 and the sponsor database 244. If a customer wants to sponsor a musician he/she may transmit a sponsorship request to the sponsor management part 264 via the customer terminal 115, 116. The sponsorship request may contain information of the sponsor, information of the musician to be sponsored and amount of the sponsorship. The sponsor management part 264 may transmit a message recommending for sponsorship to customer terminals 115, 116 based on the fan relationship data stored in the fan database 242. The monetary transaction that may occur according to the sponsorship may be processed by the settlement server 150.

When a sponsorship request is received from the customer terminal 115, 116 the sponsor management part 264 produces sponsorship data between the sponsor and the sponsored musician and stores the sponsorship data to the sponsor database 244. The sponsor database 244 may store the sponsorship data for each musician and customer.

Considering the fan relationship between musician and customer of the present invention, it is to be easily understood that the sponsorship recommendation process allows the musician to have an efficient promotion mechanism for sponsorship toward a number of fans who are likely to be interested in the recommended sponsorship in a short period of time. In this way, a social funding for musicians is available within the system of the present invention.

Figure 3:
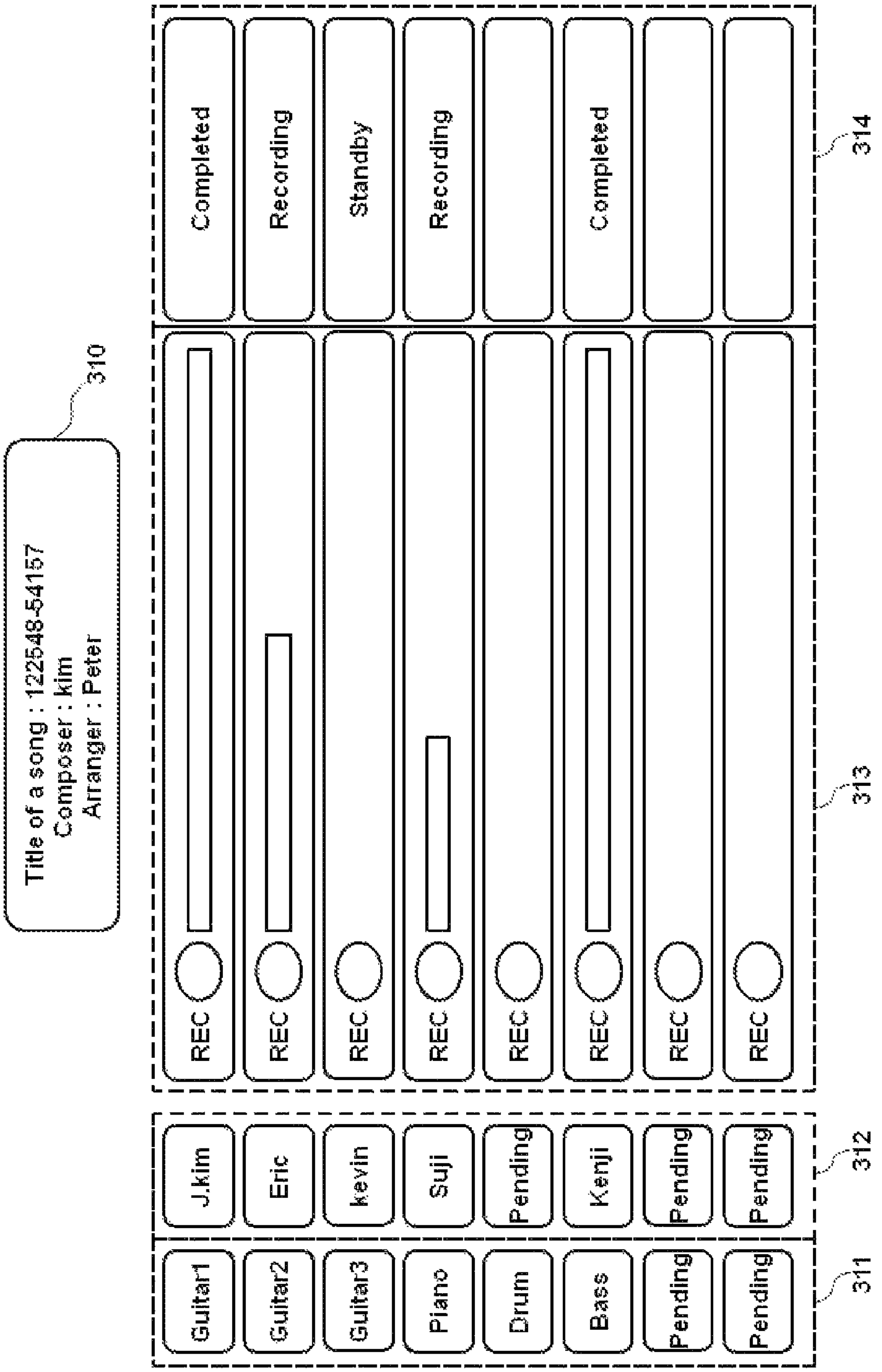
FIG. 3 is an exemplary screen display on an instrumental player terminal connected through a network to a music data server according to the system of FIG. 1.

FIG. 3 is an exemplary screen display on an instrumental player terminal connected through a network to a music data server according to the system of FIG. 1.

The displayed information comprises a bibliographical data 310 of the instrumental music, musical instrument type 311, instrumental player information 312 for each musical instrument, process data 313 showing the degree of overall process and recording data 314 showing the degree of recording process.

In an embodiment where an arranger is involved in the stage of instrumental play for his/her own arrangement, the arranger may also use the screen display of FIG. 3.

Figure 4:
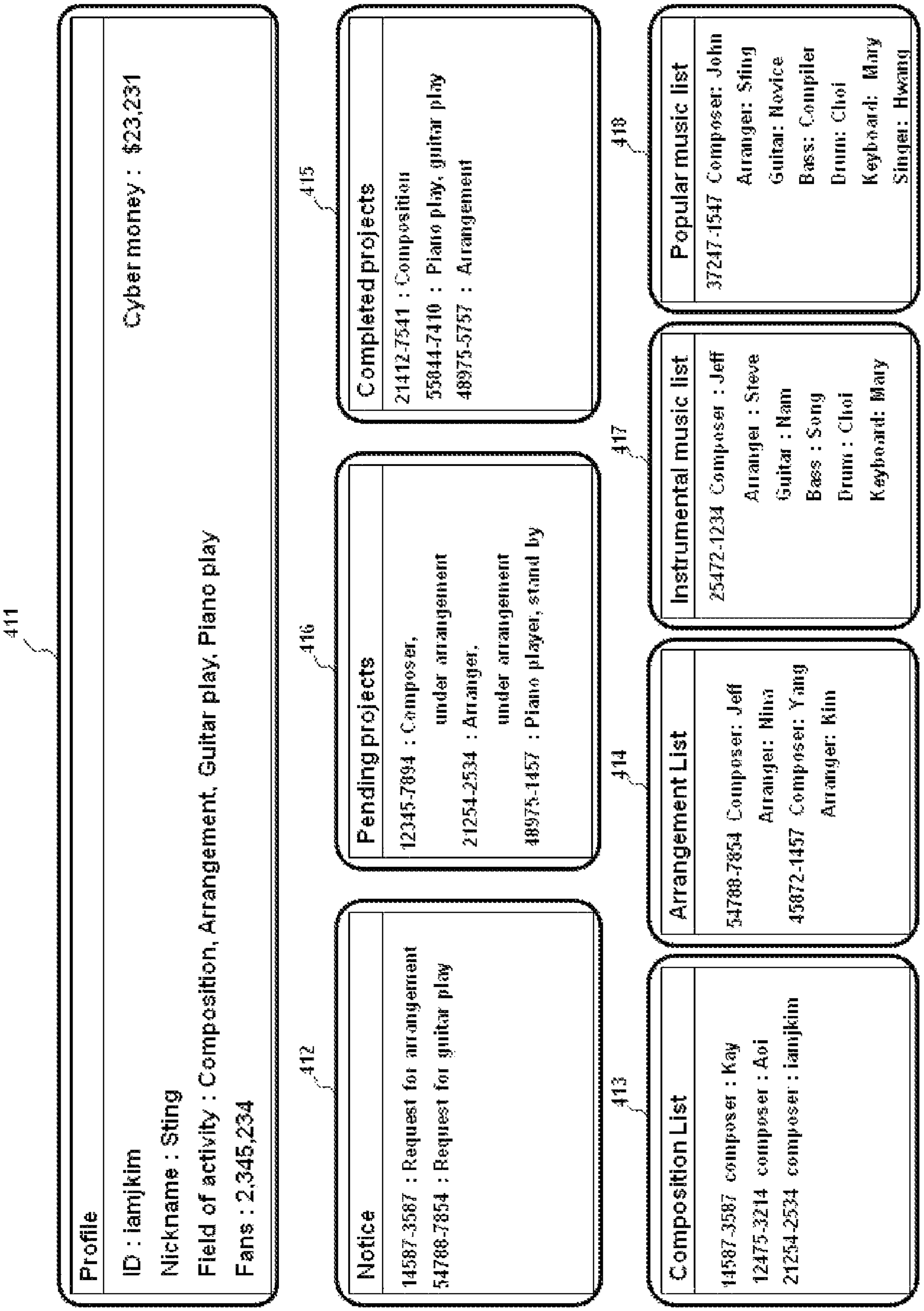
FIG. 4 is an exemplary screen display on a musician terminal connected through a network to a music data server according to the system of FIG. 1.

FIG. 4 is an exemplary screen display on a musician terminal connected through a network to a music data server according to the system of FIG. 1.

The displayed information comprises a Profile window 411 showing the profile of the musician, a Notice window 412 showing important notices to the musician, a Pending projects window 416 showing pending projects in which the musician is currently involved, a Completed projects window 415 showing completed projects in which the musician has been involved, a Composition list window 413 showing the list of composed music data of interest, an Arrangement list window 414 showing the list of arranged music data of interest, an Instrumental music list window 417 showing the list of instrumental music data of interest, and a popular music list window 418 showing the list of popular music data of interest.

The musician of FIG. 4 is a composer, arranger, guitar and piano player at the same time and thus the screen display shows as many kinds of information as possible at a time. The screen display on the musician terminal may vary according to the role of a musician in the present invention. The shape, function and contents of the windows 411-418 may also vary according to various embodiments of the present invention.

Figure 5:
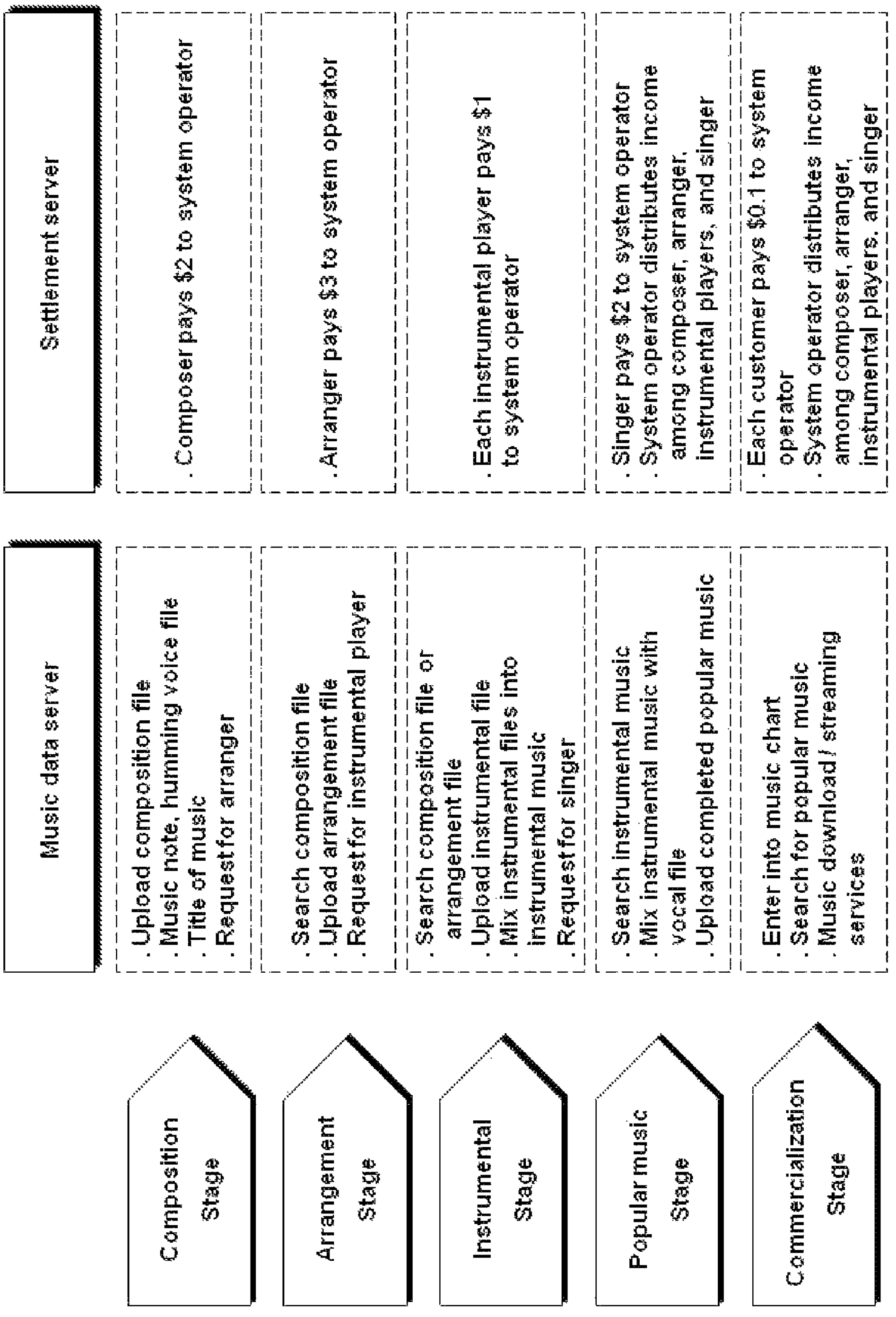
FIG. 5 is an explanatory diagram showing the generating flow of popular music and related settlement flow according to a method of an embodiment of the present invention.

FIG. 5 is an explanatory diagram showing the generating flow of popular music and related settlement flow according to a method of an embodiment of the present invention.

The overall flow for generating the popular music is identical to those explained with regard to FIGS. 1 and 2 and the explanation thereof shall be omitted.

The settlement flow in the settlement server shows exemplary monetary transactions at each stage of an embodiment of the present invention. When a composer uploads his/her composed music data to a music data server he/she shall pay, for example, two dollars as upload fee via communications with the settlement server. In FIG. 5, the upload fee for an arranger is three dollars and the upload fee for each instrumental player is one dollar. These upload fees paid by musicians may be given to the system operator as income for stable operation of the system.

The instrumental music data generated at the instrumental stage shall be a source of income for the musicians such as composer, arranger and instrumental players since the instrumental music data could be frequently and commercially downloaded by people who desire to sing a song based on the instrumental music file. In this regard, we can assume that the number of people who desire to sing will even more than the numeric sum of the musicians. Download fees paid by each person or singer shall be distributed among the musicians including composer, arranger and instrumental players.

The popular music data generated at the commercialization stage shall be a main source of income for the musicians including composer, arranger, instrumental players and singer. Here, we can assume that the number of people who download the popular music data will be much more than the numeric sum of the musicians including composer, arranger, instrumental players as well as singer.

The completed instrumental music data and the completed popular music data will be eligible for a secondary commercialization process including music album design, music broadcasting, online/offline music performance, social funding for musicians, and music sales via smart phone application. A further income generated by the above secondary commercialization process shall also be supposed to be distributed among musicians who contributed to the process of completing the sold music data.

Figure 6:
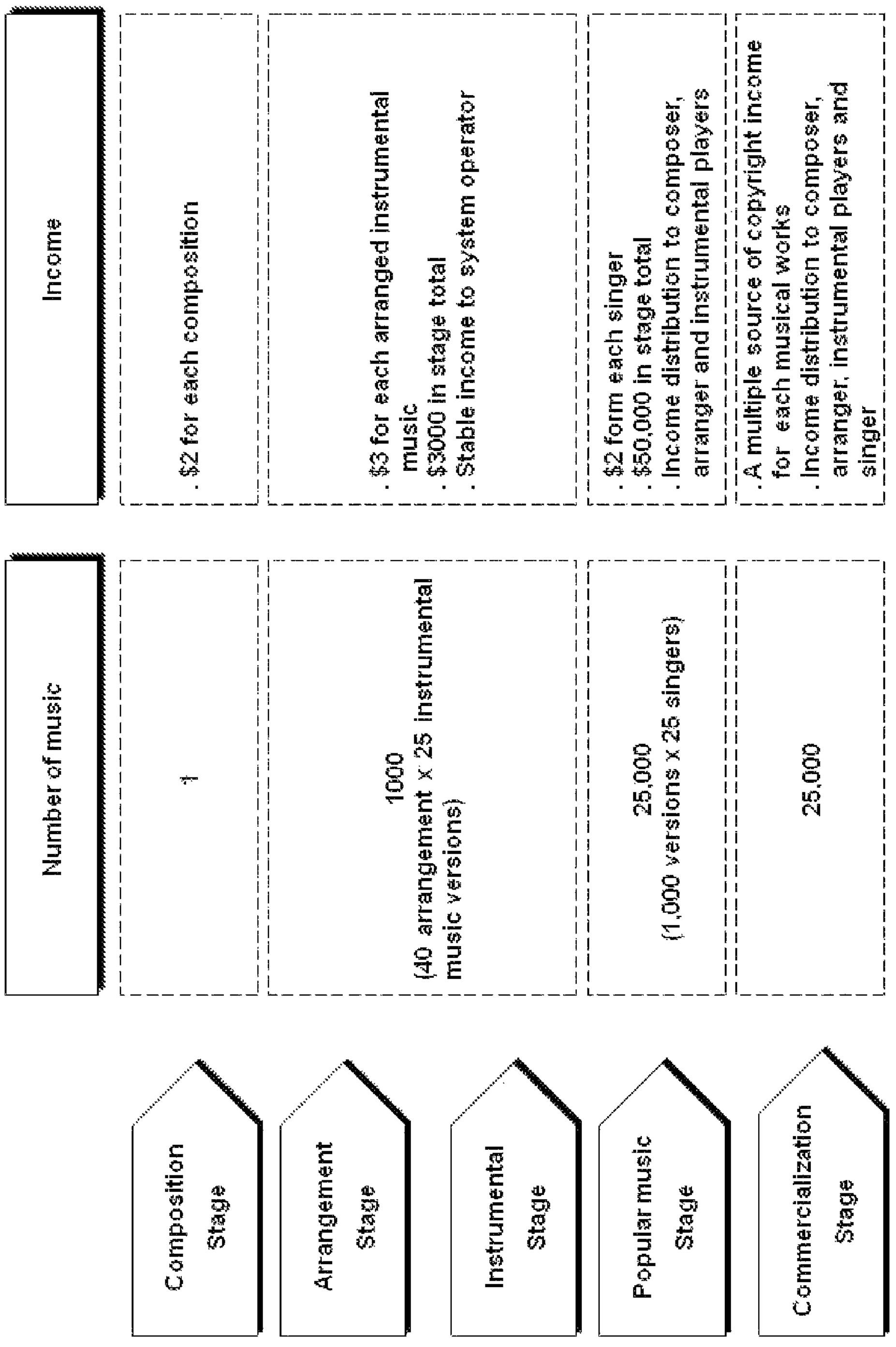
FIG. 6 is an explanatory diagram showing the generation of various versions of music data and income model according to a method of FIG. 5.

FIG. 6 is an explanatory diagram showing the generation of various versions of music data and income model according to a method of FIG. 5.

In FIG. 6 it is assumed that forty versions of arrangements may be made by different arrangers based on a piece of composed music data and twenty-five versions of instrumental music may be made by different instrumental player team for each piece of arranged music. At the end of the instrumental stage a thousand versions of instrumental music data are generated. In the popular music stage, twenty-five thousand versions of popular music may be generated based upon a thousand versions of instrumental music data.

Here, the exact number of different versions of music data is not important in the present invention. The point is that a large number of music data of different versions and/or musical genres could be very easily generated in a short period of time according to the present invention, which is totally different from the conventional musical environment where only one version of popular or instrumental music normally exists with regard to a given musical composition.

The foregoing detailed description is illustrative of a preferred embodiment of the present invention, and it is to be understood that additional embodiments thereof will be obvious to those skilled in the art. The embodiments described herein together with those additional embodiments are considered to be within the scope of the present invention.

The invention claimed is:

1. A system for providing music data, the system comprising:

a music data server configured to transmit and receive music data to and from at least two musician terminals including a former stage musician terminal and a latter stage musician terminal; and a settlement server configured to perform settlement transactions related to music data upload fees for uploading the music data and music data download fees for downloading the music data, between the music data server and the musician terminals, wherein the music data server is further configured to receive former stage music data from the former stage musician terminal, store the received former stage music data, transmit the stored former stage music data to the latter stage musician terminal upon request from the latter stage musician terminal, receive the latter stage music data from the latter stage musician terminal, and store the received latter stage music data.

2. The system of claim 1, wherein the settlement server is further configured to distribute the music data download fees to each of the musician terminals related to the music data.

3. The system of claim 1, wherein upon a request from the former musician terminal designating at least one latter musician terminal, the music data server is further configured to transmit a music data upload status to the designated latter musician terminal, and a request for latter stage music data from the designated latter musician terminal.

4. The system of claim 1, wherein upon a request from the former musician terminal designating at least one latter musician terminal, the music data server is further configured to perform at least one of a permission, a rejection or a deletion of the music data uploaded by the designated latter musician terminal.

5. The system of claim 4, wherein the settlement server is further configured to refund the music data upload fees charged from the latter musician terminal when the music data uploaded by the latter musician terminal is rejected or deleted by the music data server upon the request from the former musician terminal.

6. The system of claim 1, further comprising a plurality of customer terminals, wherein the music data server is further configured to allow the customer terminals to download the stored music data, and wherein the settlement server is further configured to charge music data download fees, and distribute the charged fees to each of the musician terminals related to the downloaded music data.

7. The system of claim 6, wherein the music data server is further configured to define a customer who downloaded the music data, and transmit uploaded or updated information regarding the music data to the defined customer's customer terminal.

8. The system of claim 6, the music data server is further configured to transmit a request for sponsorship for sponsoring a musician or a piece of music data to at least one of the customer terminals, and receive a sponsorship deal designating a musician or a piece of music data from the at least one customer terminal, and wherein the settlement server is further configured to receive sponsorship contribution, and distribute the sponsorship contribution to the designated musician or music data.

9. A system for providing music data, the system comprising:

a music data server configured to transmit and receive music data to and from a plurality of musician terminals including at least one composer terminal, at least one arranger terminal, at least one instrumental player terminal and at least one singer terminal; and a settlement server configured to perform settlement transactions related to music data upload fees for uploading the music data and music data download fees for downloading the music data, between the music data server and the musician terminals, wherein the music data server comprises:

a composed music processing means for receiving a composed music file and information related to the composed music file from the composer terminal, generating composed music data from the composed music file and the information related to the composed music file, and storing the composed music data to a composed music database;

an arranged music processing means for transmitting the composed music data to the arranger terminal, receiving arranged music file and information related to the arranged music file from the arranger terminal, generating arranged music data from the arranged music file and information related to the arranged music file, and storing the arranged music data to an arranged music database;

an instrumental music processing means for transmitting the arranged music data to the instrumental player terminal, receiving an instrumental music file and information related to the instrumental music file from the instrumental player terminal, generating instrumental music data from the instrumental music file and the information related to the instrumental music file, and storing the instrumental music data to an instrumental music database; and a popular music processing means for transmitting the instrumental music data to the singer terminal, receiving a popular music file and information related to the popular music file from the singer terminal, generating popular music data from the popular music file and the information related to the popular music file, and storing the popular music data to a popular music database.

10. The system of claim 9, wherein the information related to the composed music file comprises information of musician and at least one other information regarding generation date of copyright, explanation of music, a request for latter musical works, and musician's comment.

11. The system of claim 10, wherein the information related to the arranged music file comprises a request for a set of instrumental players, and wherein the instrumental music processing means is further for transmitting the arranged music data to a set of instrumental player terminals corresponding to the request, receiving a set of instrumental music files distinguishable by musical instrument type from the set of instrumental player terminals, generating a whole piece of instrumental music data by mixing the instrumental music files, and storing the generated instrumental music data to the instrumental music database.

12. The system of claim 10, wherein the information related to the arranged music file comprises a request for an arranger review of the instrumental music data, and wherein the instrumental music processing means is further for transmitting a portion or an entirety of an instrumental music file to the arranger terminal, and performs performing permission, rejection or deletion of the portion or the entirety of the instrumental music file upon a relevant request from the arranger terminal.

13. The system of claim 9, wherein the popular music processing means is further for transmitting the instrumental music data to the singer terminal, receives receiving a vocal file and information related to the vocal file from the singer terminal, generates generating the popular music data by mixing the instrumental music file from the instrumental music database and the vocal file received from the singer terminal, and storing the popular music data to the popular music database, wherein the popular music data comprise the popular music file and the information related to the popular music file, and wherein the information related to the popular music file includes information of each musician who has been involved in the process of completing the popular music data.

14. The system of claim 9, wherein the music data server and the settlement server are connected to a plurality of customer terminals, and wherein the music data server further comprises a download processing part and a download information database, and wherein the download processing part is configured to count the number of times of download with regard to the music data, and store count data to the download information database.

15. The system of claim 14, wherein the download processing part is configured to generate popularity data for each piece of music and each musician based on the count data, and store the popularity data to the download information database.

16. The system of claim 14, wherein the music data server further comprises a fan management part configured to generate and manage fan relationship data between each musician and customer based on download information retrieved from the download information database, and a fan database configured to store the fan relationship data, and wherein the fan management part is configured to send to a customer terminal, recommendations regarding other music data uploaded or updated by a musician whom a customer has a fan relationship with.

17. The system of claim 16, wherein the music data server further comprises:

a sponsor management part configured to generate and manage sponsor relationship data between sponsoring customer and musician to be sponsored based on fan relationship data retrieved from the fan database, and a sponsor database configured to store the sponsorship data for each musician and customer.

18. The system of claim 16, wherein the fan management part is configured to define a customer who downloaded music data in which a particular musician has been involved to be a fan of the particular musician.

* * * * *